US009707925B2

(12) United States Patent
Tombe (10) Patent No.: US 9,707,925 B2
(45) Date of Patent: Jul. 18, 2017

(54) SEATBELT CONTROL DEVICE, SEATBELT APPARATUS, AND SEATBELT CONTROL METHOD (71) Applicant: Hideyuki Tombe, Tokyo (JP)

(72) Inventor: Hideyuki Tombe, Tokyo (JP)

(73) Assignee: Takata Corporation, Tokyo (JP)

( * ) Notice: Subject to any disclaimer, the term of this patent is extended or adjusted under 35 U.S.C. 154(b) by 46 days.

(21) Appl. No.: 14/772,469

(22) PCT Filed: Feb. 12, 2014

(86) PCT No.: PCT/JP2014/053222
§ 371 (c)(1),
(2) Date: Sep. 3, 2015

(87) PCT Pub. No.: WO2014/148152
PCT Pub. Date: Sep. 25, 2014

(65) Prior Publication Data
US 2016/0355158 A1 Dec. 8, 2016

(30) Foreign Application Priority Data
Mar. 19, 2013 (JP) .................................. 2013-057314

(51) Int. Cl.
B60R 22/48 (2006.01)
B60R 22/34 (2006.01)
H02P 1/02 (2006.01)
B60R 22/44 (2006.01)

(52) U.S. Cl.
CPC .............. B60R 22/48 (2013.01); B60R 22/34 (2013.01); H02P 1/02 (2013.01); B60R 2022/4473 (2013.01)

(58) Field of Classification Search
CPC ................................ B60R 22/48; B60R 22/34
See application file for complete search history.

(56) References Cited

U.S. PATENT DOCUMENTS 7,422,085 B2 9/2008 Kitazawa
8,893,998 B2 11/2014 Midorikawa et al.
2001/0004030 A1* 6/2001 Yano ...................... B60R 22/44
180/268
2006/0261589 A1* 11/2006 Tanaka ................... B60R 22/02
280/806

(Continued)

FOREIGN PATENT DOCUMENTS

EP 1738977 1/2007
EP 2314961 4/2011

(Continued)

OTHER PUBLICATIONS

International Search Report mailed on Apr. 22, 2014.

Primary Examiner — Faye M Fleming
(74) Attorney, Agent, or Firm — IPUSA, PLLC (57) ABSTRACT A seatbelt control device for controlling a seatbelt provided in a vehicle, and a seatbelt apparatus having the seatbelt control device, are provided with a restricting circuit that restricts control of the seatbelt in a case in which restricting the control of the seatbelt is permitted, and the restricting circuit, in a case in which a door provided on the vehicle is open, restricts the control of the seatbelt at a timing slower than that for a case in which the door is closed.

10 Claims, 5 Drawing Sheets (56) References Cited

U.S. PATENT DOCUMENTS

| | | | |
|---|---|---|---|
| 2013/0033372 A1* | 2/2013 | Medel | B60R 22/48 340/438 |
| 2013/0088001 A1* | 4/2013 | Park | B60R 22/03 280/801.2 |
| 2014/0103696 A1* | 4/2014 | Odate | B60R 22/03 297/469 |

FOREIGN PATENT DOCUMENTS

| | | |
|---|---|---|
| JP | 2006-175896 | 7/2006 |
| JP | 2010-048442 | 3/2010 |
| JP | 2011-031664 | 2/2011 |
| JP | 2011-230547 | 11/2011 |
| WO | 2005/051732 | 6/2005 |

* cited by examiner

SEATBELT CONTROL DEVICE, SEATBELT APPARATUS, AND SEATBELT CONTROL METHOD

TECHNICAL FIELD

The present invention relates to a seatbelt control device, a seatbelt apparatus, and a seatbelt control method.

BACKGROUND ART

Conventionally, in a state in which ignition is off, there is a known technique that stops a supply of power from a power supply to a seatbelt control means in a case in which an accumulated time of the supply of power from the power supply to the seatbelt control means is a predetermined threshold time or longer (for example, refer to Patent Document 1).

PRIOR ART DOCUMENTS

Patent Documents

Patent Document 1: Japanese Laid-Open Patent Publication No. 2011-230547

DISCLOSURE OF THE INVENTION

Problem to be Solved by the Invention

However, according to prior art, the seatbelt control is always restricted when the accumulated time described above becomes the predetermined threshold time or longer, even in a situation where it would be more convenient for a user if the seatbelt control were performed. Consequently, there are cases in which a seatbelt control comfortable for the user cannot be provided.

One object of the present invention is to provide a seatbelt control device, a seatbelt apparatus, and a seatbelt control method, which can improve convenience to the user.

Means of Solving the Problem

In order to achieve the object described above, one aspect of the present invention provides a seatbelt control device that controls a seatbelt provided in a vehicle, and a seatbelt apparatus having the seatbelt control device, that are provided with a restricting circuit that restricts control of the seatbelt in a case in which restricting the control of the seatbelt is permitted, wherein the restricting circuit, in a case in which a door provided on the vehicle is open, restricts the control of the seatbelt at a timing slower than that for a case in which the door is closed.

In order to achieve the object described above, another aspect of the present invention provides a seatbelt control device that controls a seatbelt provided in a vehicle, and a seatbelt apparatus having the seatbelt control device, that are provided with a restricting circuit that restricts control of the seatbelt at a timing slower in a case in which a possibility of the seatbelt being fastened or unfastened is high than that for a case in which the possibility of the seatbelt being fastened or unfastened is low.

In order to achieve the object described above, still another aspect of the present invention provides a control method that controls a seatbelt provided in a vehicle, including, in a case in which a door provided on the vehicle is open, restricting control of the seatbelt at a timing slower than that for a case in which the door is closed.

Effects of the Invention

According to the seatbelt control device, the seatbelt apparatus, and the seatbelt control method, it is possible to improve convenience to the user.

MODE OF CARRYING OUT THE INVENTION

Figure 1:
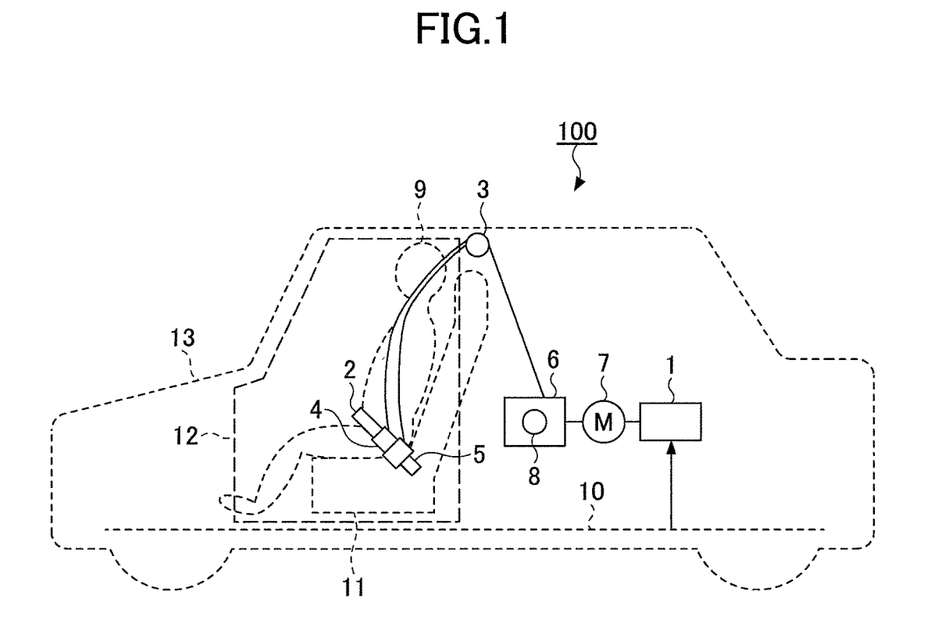
FIG. 1 is a diagram illustrating a configuration of a seatbelt apparatus in one embodiment.

FIG. 1 is a diagram illustrating a configuration of a seatbelt apparatus 100 in one embodiment. The seatbelt apparatus 100 is a system implemented in a vehicle 13, such as an automobile or the like. The seatbelt apparatus 100 includes a seatbelt 2, a retractor 6, a tongue 4, a buckle 5, and a seatbelt control device 1. The vehicle 13 is provided with a door 12 that can open and close. The door 12 is a passenger door used by a user 9 who gets in and out of the vehicle 13.

The seatbelt 2 is a band-shaped member for restraining the user 9 who sits on a seat 11. One end part of the seatbelt 2 is connected to the retractor 6, and the other end part of the seatbelt 2 is connected to the vehicle or a pretensioner device. The seatbelt 2 is also referred to as a webbing.

The retractor 6 is a winding-up device that enables the seatbelt 2 to be taken up or drawn out. The retractor 6 is fixed to a body part on a side of a seat back of the seat 11, such as at a lower part of a pillar to which a shoulder anchor 3 is fixed. The shoulder anchor 3 is a member that guides the seatbelt 3 towards the user 9.

The retractor 6 includes a belt reel 8, and a motor 7 that causes the seatbelt 2 to be taken up on or drawn out from the belt reel 8. The motor 7 can cause the belt reel 8 to make a forward rotation in a take-up direction in order to take up the seatbelt 2 on the belt reel 8 of the retractor 6, and to make a reverse rotation in a draw-out direction in order to draw out the seatbelt 2 from the belt reel 8 of the retractor 6.

A slack in the seatbelt 2 can be appropriately adjusted by the motor 7 that causes the seatbelt 2 to be taken up or drawn out. In addition, because the seatbelt 2 is taken up using the motor 7, it is possible, for example, to automatically accommodate the seatbelt 2 in the retractor 6, and to assist an operation in which the user 9 holds the seatbelt 2 and manually accommodates the seatbelt 2 in the retractor 6. Further, because the seatbelt 2 is drawn out using the motor 7, it is possible, for example, to automatically draw out the seatbelt 2 from the retractor 6, and to assist an operation in which the user 9 holding the seatbelt 2 can manually draw out the seatbelt 2 from the retractor 6.

The tongue 4 is a plate-shaped member that is slidably mounted on the seatbelt 2, between the vehicle or pretensioner device and the shoulder anchor 3.

The tongue 4 is attached to and detached from the buckle 5. For example, the buckle 5 is fixed to the body part on an opposite side from the retractor 6 with respect to a seat part of the seat 11, and is a part to which the tongue 4 is inserted and from which the tongue 4 is extracted.

The seatbelt control device 1 is a computer that controls a take-up operation or a draw-out operation of the seatbelt 2, by driving the motor 7. The seatbelt control device 1 acquires, via a signal line 10, signals indicating states of various parts of the vehicle 13, from another computer and sensors (including switches) provided on the vehicle 13. An example of the seatbelt control device 1 includes an electronic control unit (so-called ECU: Engine Control Unit) for controlling the seatbelt. Examples of the signal line 10 include a wire harness for transmitting high-level and low-level signals, a communication line, such as a CAN (Controller Area Network) or the like, for transmitting data according to a predetermined communication standard, or the like.

The seatbelt control device 1 includes a function to restrict the control of the seatbelt 2 in a state in which a predetermined permitting condition for restricting the control of the seatbelt 2 is satisfied, after the predetermined condition is satisfied.

Even in a situation where restricting the control of the seatbelt 2 is permissible, the user convenience of the seatbelt 2 deteriorates when the control of the seatbelt 2 is restricted, because the seatbelt apparatus 100 cannot perform the take-up operation and the draw-out operation of the seatbelt 2.

However, in the situation where restricting the control of the seatbelt 2 is permissible, a possibility that the user is located far away from the vehicle 13 is lower for a case in which the door 12 is open as compared to a case in which the door 12 is closed, and a possibility that the user (passenger) is inside or is in a vicinity of the vehicle 13 is high. When the possibility that the user is inside or is in the vicinity of the vehicle 13 is high, a possibility that the user will fasten or unfasten the seatbelt 2 is also high.

Accordingly, the seatbelt control device 1 includes a function to restrict the control of the seatbelt 2 in the case in which the door 12 is open, at a timing slower than for the case in which the door 12 is closed. By providing such a restricting function, a time during which the control of the seatbelt 2 is not restricted in the case in which the possibility that the user is inside or is in the vicinity of the vehicle 13 is high and the possibility that the user will fasten or unfasten the seatbelt 2 is high, becomes longer as compared to the case in which these probabilities are low. As a result, when the user fastens or unfastens the seatbelt 2, an inconvenience of not being able to control the seatbelt 2 due to the restricted control of the seatbelt 2 is less likely to occur, and the user convenience of the seatbelt 2 can be improved. In addition, because it is unnecessary to provide a configuration to detect whether the user got out of or got into the vehicle 13, it is possible to improve the user convenience at a low cost.

Figure 2:
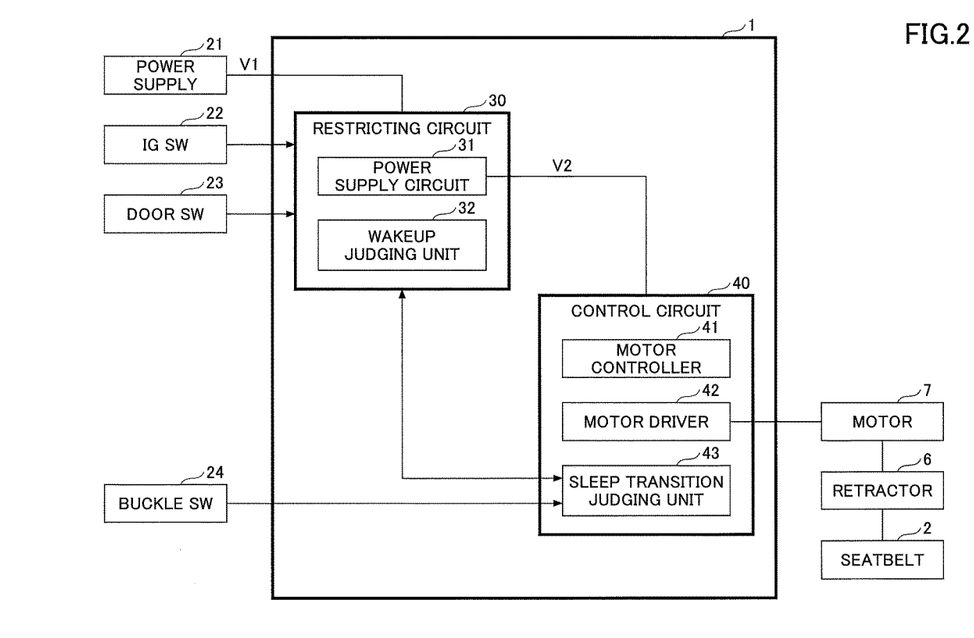
FIG. 2 is a diagram illustrating a configuration of a seatbelt control device in one embodiment.

FIG. 2 is a diagram illustrating a configuration of the seatbelt control device 1 in one embodiment. The seatbelt control device 1 includes a restricting circuit 30 that restricts the control of the seatbelt 2 only in the case in which the restricting the control of the seatbelt 2 is permitted. The restricting circuit 30 is a circuit that restricts the control of the seatbelt 2 in the case in which the door 12 is open, at the timing slower than for the case in which the door 12 is closed. By providing this restricting circuit 30 in the seatbelt control device 1, the timing at which the control of the seatbelt 2 is restricted in the case in which the door 12 is open can be delayed compared to the timing at which the control of the seatbelt 2 is restricted in the case in which the door 12 is closed. As a result, the user convenience of the seatbelt 2 can be improved, and a seatbelt control comfortable for the user can be provided.

The restricting circuit 30 is a circuit that restricts the control of the seatbelt 2 in the case in which the possibility of the user fastening or unfastening the seatbelt 2 is high, at the timing slower than for the case in which the possibility of the user fastening or unfastening the seatbelt 2 is low. By providing this restricting circuit 30 in the seatbelt control device 1, the timing at which the control of the seatbelt 2 is restricted in the case in which the possibility of the user fastening or unfastening the seatbelt 2 is high can be delayed compared to the timing at which the control of the seatbelt 2 is restricted in the case in which the possibility of the user fastening or unfastening the seatbelt 2 is low. As a result, the user convenience of the seatbelt 2 can be improved, and the seatbelt control comfortable for the user can be provided.

The seatbelt control device 1 may include a control circuit 40, for example, that controls the seatbelt 2. For example, the control circuit 40 is a circuit that controls the take-up operation and the draw-out operation of the seatbelt 2, by driving the motor 7 connected to the retractor 6.

The restricting circuit 30 includes a power supply circuit 31, as a power supply suppressing unit that suppresses the supply of power to the control circuit 40 in order to restrict the control of the seatbelt 2 by the control circuit 40. By providing this power supply suppressing unit such as the power supply circuit 31, a power consumption of the control circuit 40 is reduced, and thus, the user convenience of the seatbelt 2 can be improved while reducing a load applied to a power supply 21 that is provided in the vehicle 13. The power supply 21 is a power supply capable of supplying power to the seatbelt control device 1, and may be a battery, for example.

The expression "suppresses the power" may mean "cutting off the power", and the expression "suppresses the supply of power" may mean "cutting off the supply of power".

The power supply circuit 31 is a power supply unit capable of supplying power to the control circuit 40, based on the power acquired from the power supply 21, for example. The power supply circuit 31 includes a regulator that regulates a power supply voltage V1 of the power supply 21 to a power supply voltage V2, for example, and supplies the regulated power supply voltage V2 to the control circuit 40 as the power supply voltage thereof. The power supply circuit 31 may be a circuit that includes a step-up circuit or a step-down circuit. In the case in which the control of the seatbelt 2 is to be restricted, the power supply circuit 31 suppresses the power of the power supply voltage V2 from being supplied with respect to the control circuit 40.

The control circuit 40 includes a motor controller 41, a motor driver 42, and a sleep transition judging unit 43, for example.

The motor controller 41 outputs an instruction signal that operates the motor driver 42, so that motor 7 causes the take-up operation to take up the seatbelt 2 on the retractor 6 or the draw-out operation to draw out the seatbelt 2 from the retractor 6. The motor driver 42 supplies, to the motor 7, driving power to operate the motor 7, according to the instruction signal supplied from the motor controller 41.

The sleep transition judging unit 43 judges whether to permit a transition of an operation mode of the seatbelt control device 1 from a normal mode to a sleep mode, based on a predetermined sleep permitting condition (hereinafter also simply referred to as sleep condition). The normal mode is an operation mode in which the seatbelt control device 1 can control the operation of the seatbelt 2, and the sleep mode is an operation mode in which the seatbelt control device 1 cannot control the operation of the seatbelt 2.

In a case in which the sleep condition is satisfied, the sleep transition judging unit 43 permits the transition from the normal mode to the sleep mode, and notifies with respect to the restricting circuit 30 a sleep transition instruction indicating that the sleep condition is satisfied. When the power supply circuit 31 of the restricting circuit 30 is notified of the sleep transition instruction from the sleep transition judging unit 43, the power supply circuit 31 suppresses the power supplied to the control circuit 40, for example, in order to restrict the control of the seatbelt 2. By suppressing the supply of power to the control circuit 40, the power consumption of the control circuit 40 is reduced, and the operation mode of the seatbelt control device 1 makes the transition from the normal mode to the sleep mode in which the power consumption of the seatbelt control device 1 is lower than that in the normal mode.

An example of the motor controller 41 and the sleep transition judging unit 43 includes an electronic circuit having a microcomputer provided with a CPU. In addition, an example of the motor driver 42 includes an H-bridge circuit having four switching elements.

For example, in a state in which ignition provided in the vehicle 13 is off, the restricting circuit 30 suppresses the supply of power to the control circuit 40, in order to restrict the control of the seatbelt 2. Accordingly, in the state in the off state of the ignition, it is possible to reduce a dark current that is generated due to a current flowing from the power supply 21 to the seatbelt control device 1.

On and off states of the ignition can be detected by an ignition switch 22 (IG SW 22) provided in the vehicle 13. The ignition switch 22 outputs an ignition signal (IG signal) that distinguishes the on state and the off state of the ignition, and a voltage level of the IG signal varies according to a transition from the on state to the off state or a transition from the off state to the on state. The IG signal is input to the restricting circuit 30 to which the power from the power supply 21 is constantly supplied, and is input to the control circuit 40 via the restricting circuit 30.

In the normal mode in which the power is supplied to the control circuit 40 without being restricted by the restricting circuit 30, the control circuit 40 can judge whether the ignition is in the on state or the off state, based on the voltage level of the IG signal that is input to the control circuit 40 via the restricting circuit 30. In addition, in the normal mode, the control circuit 40 can detect an on timing and an off timing of the ignition, based on a varying timing of the voltage level of the IG signal. The on timing of the ignition is the timing at which the ignition makes the transition from the off state to the on state, and the off timing of the ignition is the timing at which the ignition makes the transition from the on state to the off state.

For example, in the off state of the ignition, in a case in which the door 12 remains open and no operation is performed on the door 12 and the buckle 5, the restricting circuit 30 restricts the control of the seatbelt 2 at a timing that is slower than for a case in which the door 12 remains closed and no operation is performed on the door 12 and the buckle 5. Accordingly, when the user fastens or unfastens the seatbelt 2, an inconvenience of not being able to control the seatbelt 2 due to the restricted control of the seatbelt 2 is less likely to occur, and the user convenience of the seatbelt 2 can be improved.

In the off state of the ignition, the sleep transition judging unit 43 of the control circuit 40 can judge a continuity of the state in which the door 12 remains open and no operation is performed on the door 12 and the buckle 5. Similarly, in the off state of the ignition, the sleep transition judging unit 43 of the control circuit 40 can judge a continuity of the state in which the door 12 remains closed and no operation is performed on the door 12 and the buckle 5.

In the off state of the ignition, in a case in which there is continuity in the state in which the door 12 remains open and no operation is performed on the door 12 and the buckle 5, the sleep transition judging unit 43 of the control circuit 40 may judge that there is a high possibility that the seatbelt 2 will be fastened or unfastened. Similarly, in the off state of the ignition, in a case in which there is continuity in the state in which the door 12 remains closed and no operation is performed on the door 12 and the buckle 5, the sleep transition judging unit 43 of the control circuit 40 may judge that there is a low possibility that the seatbelt 2 will be fastened or unfastened.

Open and closed states of the door 12 can be detected by a door switch 23 (door SW 23) provided in the vehicle 23. The door switch 23 outputs a door signal that distinguishes the open state and the closed state of the door 12, and a voltage level of the door signal varies according to a transition from the open state to the closed state or a transition from the closed state to the open state. The door signal is input to the restricting circuit 30 to which the power from the power supply 21 is constantly supplied, and is input to the control circuit 40 via the restricting circuit 30.

In the normal mode in which the power is supplied to the control circuit 40 without being restricted by the restricting circuit 30, the control circuit 40 can judge whether the door 12 is in the open state or the closed state, based on the voltage level of the door signal that is input to the control circuit 40 via the restricting circuit 30. In addition, in the normal mode, the control circuit 40 can detect an opening or closing timing of the door 12, based on a varying timing of the voltage level of the door signal. The opening or closing timing of the door 12 is the timing at which the door 12 makes the transition from the open state to the closed state, or the timing at which the door 12 makes the transition from the closed state to the open state.

An operation state of the buckle 5 (that is, a fastened or unfastened state of the seatbelt 2) can be detected by a buckle switch 24 (buckle SW 24) provided in the buckle 5. The buckle switch 24 outputs a buckle signal that distinguishes a fastened state in which the tongue 4 is attached to the buckle 5 and an unfastened state in which the tongue 4 is removed from the buckle 5. A voltage level of the buckle signal varies according to a transition of the seatbelt 2 from the fastened state to the unfastened state or a transition from the unfastened state to the fastened state. The buckle signal is input to the control circuit 40, and not via the restricting circuit 30 to which the power from the power supply 21 is constantly supplied.

In the normal mode in which the power is supplied to the control circuit 40 without being restricted by the restricting circuit 30, the control circuit 40 can judge whether the seatbelt 2 is in the fastened state or the unfastened state, based on the voltage level of the buckle signal that is input directly to the control circuit 40. In addition, in the normal mode, the control circuit 40 can detect a fastening timing and an unfastening timing of the seatbelt 2, based on a varying timing of the voltage level of the buckle signal. The fastening timing of the seatbelt 2 is the timing at which the seatbelt 2 makes transition from the unfastened state to the fastened state, and the unfastening timing of the seatbelt 2 is the timing at which the seatbelt 2 makes the transition from the fastened state to the unfastened state.

The restricting circuit 30 includes a wakeup judging unit 32 that judges whether or not to cancel the sleep mode of the seatbelt control device 1, based on a predetermined sleep cancel condition, for example. In a case in which the sleep cancel condition is satisfied, the wakeup judging unit 32 cancels the sleep mode, and the operation mode of the seatbelt control device 1 is caused to make a transition from the sleep mode to the normal mode. Accordingly, it becomes possible for the seatbelt control device 1 to control the operation of the seatbelt 2.

For example, the wakeup judging unit 32 may cancel the restriction on the control of the seatbelt 2, by causing the power supply circuit 31 to stop suppressing the supply of power with respect to the control circuit 40. Hence, the power supplied from the power supply circuit 31 to the control circuit 40 returns to a normal value, and it becomes possible for the seatbelt control device 1 to control the operation of the seatbelt 2.

In the seatbelt control device 1 illustrated in FIG. 2, the buckle signal supplied from the buckle switch 24 is input directly to the control circuit 40, and not via the restricting circuit 30 to which the power from the power supply 21 is constantly supplied. For this reason, upon completion of the transition to the sleep mode in which the supply of power to the control circuit 40 is restricted, the operation mode cannot return to the normal mode from the sleep mode even when the user fastens or unfastens the seatbelt 2 (the tongue 4 is inserted into or extracted from the buckle 5). Because the sleep mode will not be canceled, the seatbelt 2 cannot be operated, and the user convenience may deteriorate.

On the other hand, as described above, in the case in which the door 12 is open, it may be regarded that there is a high possibility that the user is inside or is in the vicinity of the vehicle 13. Hence, deterioration of the user convenience can be suppressed by determining a waiting time until the transition is made to the sleep mode to a time longer than that for the case in which the door 12 is closed.

Accordingly, the effect of improving the user convenience becomes more notable in the case in which the seatbelt control device 1 is configured to continue restricting the control of the seatbelt 2 even when the seatbelt 2 is fastened or unfastened in the state in which the control of the seatbelt 2 is restricted.

Figure 3:
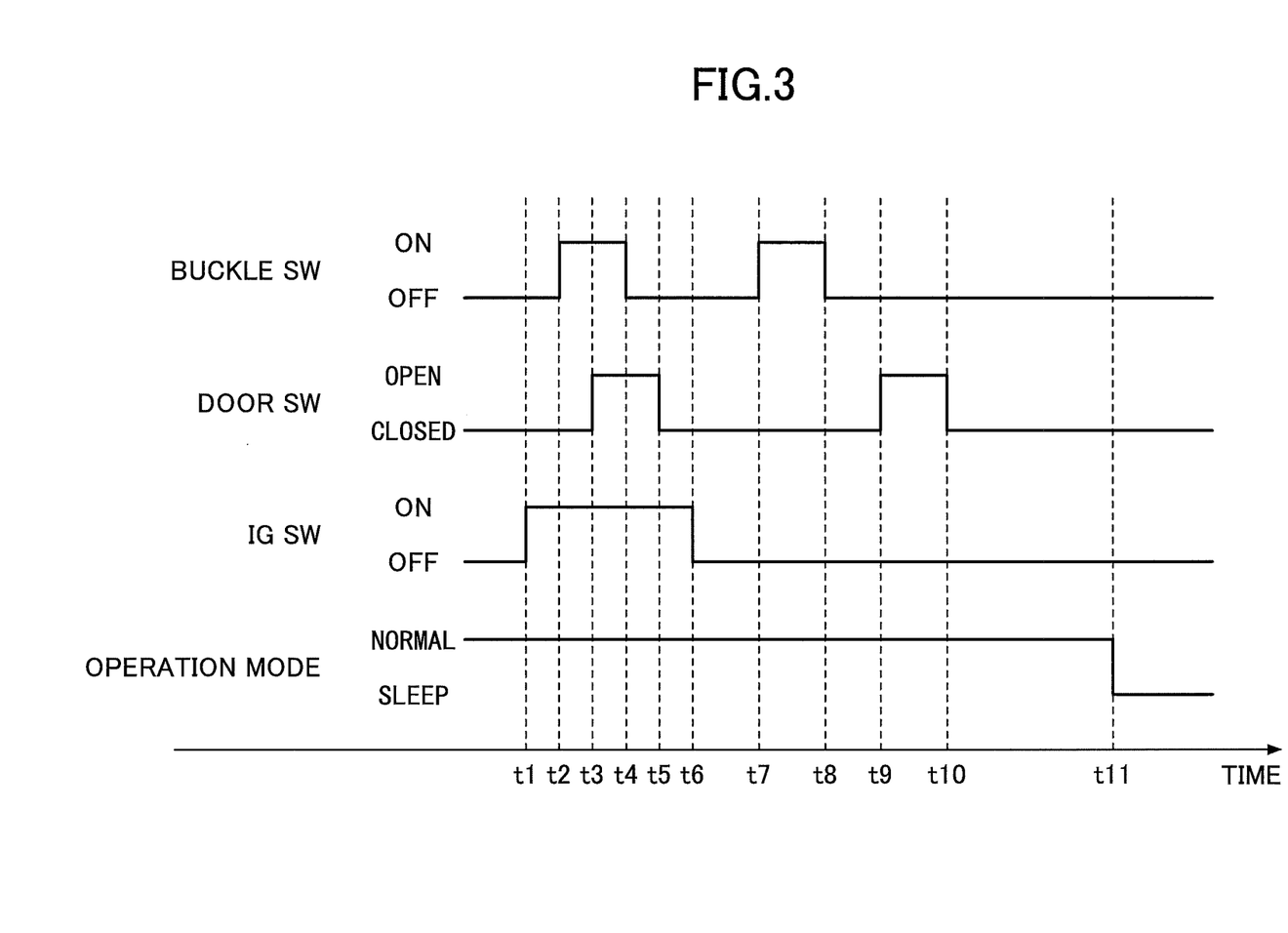
FIG. 3 is a timing chart illustrating an operation sequence of the seatbelt control device in one embodiment.

FIG. 3 is a timing chart illustrating an example of a process in which the operation mode of the seatbelt control device 1 makes the transition from the normal mode to the sleep mode. The on state of the buckle SW 24 represents the fastened state of the seatbelt 2, and the off state of the buckle SW 24 represents the unfastened state of the seatbelt 2. FIG. 3 illustrates a situation in which, in the off state of the ignition, the state in which the door 12 remains closed and no operation is performed on both the door 12 and the buckle 5 continues for a predetermined set time, the operation mode of the seatbelt control device 1 makes the transition to the sleep mode in which the control of the seatbelt 2 is restricted.

In the normal mode in which the power is supplied to the control circuit 40 without being suppressed by the restricting circuit 30, the control circuit 40 can function in a normal manner even in the off state of the ignition, and can thus detect the state and the transition timing of each of the ignition signal, the buckle signal, and the door signal.

The sleep transition judging unit 43 of the control circuit 40 is provided with a door sleep counter, for example, in order to judge whether the state in which no operation is performed on the door 12 continues for a time exceeding a predetermined set time for the door. The door sleep counter counts an elapsed time from a timing when the voltage level of the door signal varies, and resets a counted value thereof every time the voltage level of the door signal varies. Timings at which the voltage level of the door signal varies correspond to timings t3, t5, t9, and t10 in the case illustrated in FIG. 3.

The sleep transition judging unit 43 of the control circuit 40 is provided with a buckle sleep counter, for example, in order to judge whether the state in which no operation is performed on the buckle 5 continues for a time exceeding a predetermined set time for the buckle. The buckle sleep counter counts an elapsed time from a timing when the voltage level of the buckle signal varies, and resets a counted value thereof every time the voltage level of the buckle signal varies. Timings at which the voltage level of the buckle signal varies correspond to timings t2, t4, t7, and t8 in the case illustrated in FIG. 3.

The sleep transition judging unit 43 of the control circuit 40 is provided with an ignition sleep counter, for example, in order to judge whether the off state of the ignition continues for a time exceeding a predetermined set time for the ignition. The ignition sleep counter counts an elapsed time from an off timing of the IG signal, and resets a counted value thereof every time the next off timing of the IG signal is detected. The off timing of the IG signal corresponds to a timing t6 when the ignition makes the transition from the on state to the off state in the case illustrated in FIG. 3. The on timing of the IG signal corresponds to a timing t1 when the ignition makes the transition from the off state to the on state in the case illustrated in FIG. 3.

Accordingly, in a case in which the predetermined set time for the buckle elapses from the transition timing t8 of the buckle signal, the predetermined set time for the door elapses from the transition timing t10 of the door signal, and the predetermined set time for the ignition elapses from the transition timing t6 of the IG signal, respectively, the transition from the normal mode to the sleep mode occurs at a timing t11.

The set times for the ignition, the buckle, and the door may be appropriately set to suitable values.

Figure 4:
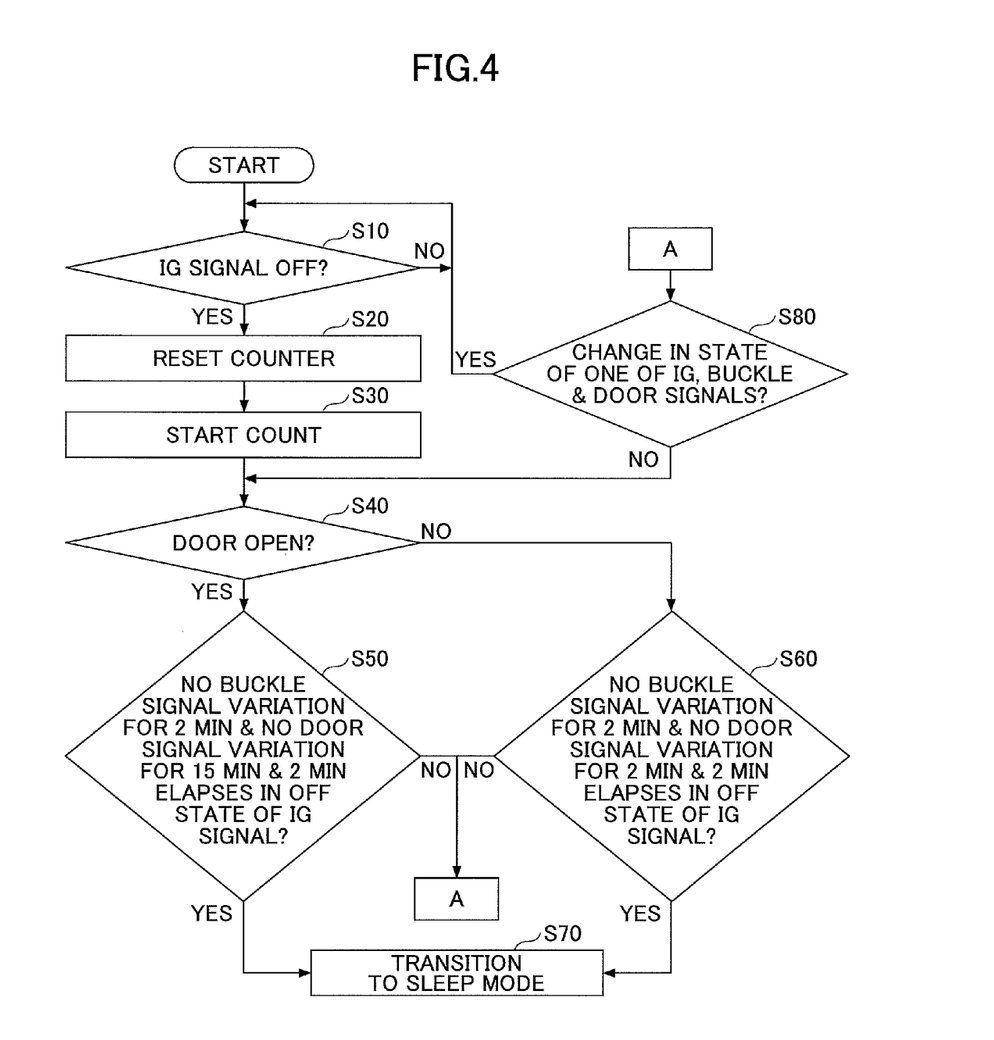
FIG. 4 is a flow chart of a first example of the operation sequence of the seatbelt control device in one embodiment.

FIG. 4 is a flow chart illustrating a first example of a seat belt control method that causes a transition of the seatbelt control device 1 from the normal mode to the sleep mode.

In step S10, the sleep transition judging unit 43 judges whether the ignition is in the off state, based on the IG signal supplied from the ignition switch 22. Processes of step S20 and subsequent steps are not performed when the ignition is not in the off state. When the ignition is in the off state, the processes of step S20 and subsequent steps are performed.

In step S20, the sleep transition judging unit 43 resets the counted values of all of the sleep counters for the ignition, the buckle, and the door. Then, in step S30, each of the sleep counters start to count.

In step S40, the sleep transition judging unit 43 judges whether the door 12 is in the open state, based on the door signal supplied from the door switch 23. The sleep transition judging unit 43 performs the process of step S50 when it is judged that the door 12 is open, and performs the process of step S60 when it is judged that the door 12 is closed.

In step S50, the sleep transition judging unit 43 judges whether the set time for the buckle (for example, two minutes) elapses in the state in which no voltage level variation of the buckle signal occurs, the set time for the door (for example, fifteen minutes) elapses in the state in which no voltage level variation of the door signal occurs, and the set time for the ignition (for example, two minutes) elapses in the off state of the IG signal.

When the sleep conditions prescribed by step S50 are satisfied, the sleep transition judging unit 43, in step S70, judges that the operation mode of the seatbelt control device 1 is to make the transition from the normal mode to the sleep mode, and outputs the sleep transition instruction with respect to the restricting circuit 30. When the restricting circuit 30 receives the sleep transition instruction and suppresses the supply of power to the control circuit 40, for example, the transition to the sleep mode is completed.

On the other hand, when the sleep conditions prescribed by step S50 are not satisfied, the sleep transition judging unit 43 performs the process of step S80. The sleep transition judging unit 43, in step S80, judges whether there is a change in the state of one of the IG signal, the buckle signal, and the door signal, and the process of step S10 is performed when it is judged that there is this change. When it is judged that there is no change in the state of any of the IG signal, the buckle signal, and the door signal, it is judged that the times measured by the counted values of each of the sleep counters have not reached the respective set times prescribed under the sleep conditions of step S50 or step S60, and the process of step S40 is performed again.

In a case in which step S20 and step S30 are performed via step S80, only the sleep counter corresponding to the signal having the voltage level variation detected in step S80 is reset, and the elapsed time is counted from the timing when this voltage level variation is detected.

On the other hand, in step S60, the sleep transition judging unit 43 judges whether the set time for the buckle (for example, two minutes) elapses in the state in which no voltage level variation of the buckle signal occurs, the set time for the door (for example, two minutes) elapses in the state in which no voltage level variation of the door signal occurs, and the set time for the ignition (for example, two minutes) elapses in the off state of the IG signal.

When the sleep conditions prescribed by step S60 are satisfied, the sleep transition judging unit 43, in step S70, judges that the operation mode of the seatbelt control device 1 is to make the transition from the normal mode to the sleep mode, and outputs the sleep transition instruction with respect to the restricting circuit 30. When the restricting circuit 30 receives the sleep transition instruction and suppresses the supply of power to the control circuit 40, for example, the transition to the sleep mode is completed.

On the other hand, when the sleep conditions prescribed by step S60 are not satisfied, the sleep transition judging unit 43 performs the process of step S80, in a manner similar to the above.

Accordingly, in the flow chart of FIG. 4, the restricting circuit 30 waits to make the transition to the sleep mode in the off state of the ignition, until the open or closed state of the door and the fastened or unfastened state of the seatbelt do not change for times exceeding the respective predetermined set times.

In addition, the set time for the door in the sleep conditions prescribed by step S50 when the door 12 is in the open state, is set in advance to a value larger than the set time for the door in the sleep conditions prescribed by step S60 when the door 12 is in the closed state. By such a setting, in the case in which the door 12 is open, the restricting circuit 30 can cause the transition from the normal mode to the sleep mode in which the control of the seatbelt 2 is restricted, after a longer time elapses from the off timing of the ignition as compared to the case in which the door 12 is closed.

For example, in the case of FIG. 3 which illustrates the transition to the sleep mode at the timing t11 in the closed state of the door 12, the set time for the door when the door 12 is in the closed state approximately matches the time from the timing t10 to the timing t11. In the case in which the set time for the door when the door 12 is in the open state is set to the value larger than the set time for the door when the door 12 is in the closed state, the timing at which the transition to the sleep mode occurs in the open state of the door 12 is delayed compared to the timing t11 at which the transition to the sleep mode occurs in the closed state of the door 12.

In addition, by setting the set time for the ignition to an appropriate value as in steps S50 and S60 of FIG. 4, the restricting circuit 30 can cause the transition to the sleep mode in which the control of the seatbelt 2 is restricted, according to the elapsed time after the off timing of the ignition. Hence, the timing at which the transition to the sleep mode occurs can be adjusted to an appropriate timing after the off timing of the ignition.

Figure 5:
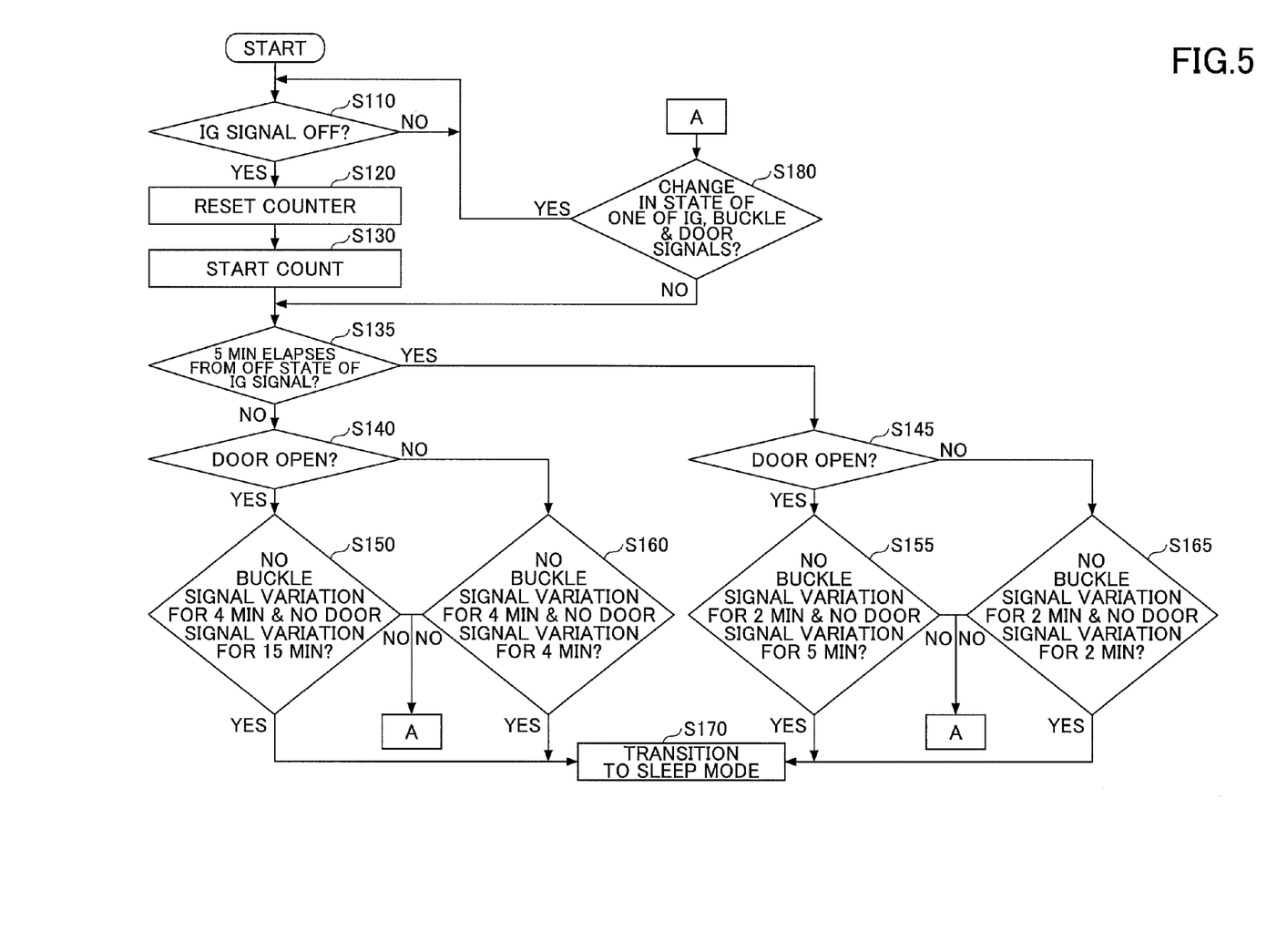
FIG. 5 is a flow chart of a second example of the operation sequence of the seatbelt control device in one embodiment.

FIG. 5 is a flow chart illustrating a second example of the seat belt control method that causes the transition of the seatbelt control device 1 from the normal mode to the sleep mode. A description of the operation and effects that are the same as those of the flow chart of FIG. 4 will be omitted.

Steps S110, S120, and S130 are similar to steps S10, S20, and S30 of FIG. 4, and a description thereof will be omitted.

In step S135, in order to vary the transition timing to the sleep mode to an appropriate timing according to the elapsed time after the the ignition is turned off, the sleep transition judging unit 43 judges whether the elapsed time from the off timing of the ignition is a predetermined time (for example, five minutes) or longer. The sleep transition judging unit 43 performs the process of step S140 in a case in which the the predetermined time has not elapsed from the off timing of the ignition, and performs the process of step S145 in a case in which the predetermined time has elapsed from the off timing of the ignition. Steps S140 and S145 are similar to step S40 of FIG. 4, and a description thereof will be omitted.

In step S150, the sleep transition judging unit 43 judges whether the set time for the buckle (for example, four minutes) elapses in the state in which no voltage level variation of the buckle signal occurs, and the set time for the door (for example, fifteen minutes) elapses in the state in which no voltage level variation of the door signal occurs.

In step S160, the sleep transition judging unit 43 judges whether the set time for the buckle (for example, four minutes) elapses in the state in which no voltage level variation of the buckle signal occurs, and the set time for the door (for example, four minutes) elapses in the state in which no voltage level variation of the door signal occurs.

In step S155, the sleep transition judging unit 43 judges whether the set time for the buckle (for example, two minutes) elapses in the state in which no voltage level variation of the buckle signal occurs, and the set time for the door (for example, five minutes) elapses in the state in which no voltage level variation of the door signal occurs.

In step S165, the sleep transition judging unit 43 judges whether the set time for the buckle (for example, two minutes) elapses in the state in which no voltage level variation of the buckle signal occurs, and the set time for the door (for example, two minutes) elapses in the state in which no voltage level variation of the door signal occurs.

In step S170, in a case in which the sleep conditions prescribed by steps S150, S155, S160, and S165 are satisfied, the sleep transition judging unit 43 judges that the operation mode of the seatbelt control device 1 is to make the transition from the normal mode to the sleep mode, and outputs the sleep transition instruction with respect to the restricting circuit 30. When the restricting circuit 30 receives the sleep transition instruction and suppresses the supply of power to the control circuit 40, for example, the transition to the sleep mode is completed.

On the other hand, in a case in which the sleep conditions prescribed by steps S150, S155, S160, and S165 are not satisfied, the sleep transition judging unit 43 performs the process of step S180. Step S180 is similar to step S80 of FIG. 4, and a description thereof will be omitted.

According to the flow chart of FIG. 5, in the case in which the elapsed time from the off timing of the ignition is the predetermined time (illustrated as five minutes in the example of step S135 of FIG. 5) or longer, the restricting circuit 30 can cause the transition to the sleep mode in which the control of the seatbelt 2 is restricted, at a timing earlier than that in the case in which the elapsed time is shorter than the predetermined time.

The possibility that the user is inside or is in the vicinity of the vehicle 13 may be assumed to be high when the elapsed time from the off timing of the ignition is less than the predetermined time, and to be low when the elapsed time is the predetermined time or more. For this reason, in the case in which the elapsed time from the off timing of the ignition is less than the predetermined time, the time until the transition to the sleep mode is made is set longer compared to the case in which the elapsed time is the predetermined time or more.

Accordingly, when the user fastens or unfastens the seatbelt 2, the inconvenience of not being able to control the seatbelt 2 due to the restricted control of the seatbelt 2 is less likely to occur, and the user convenience of the seatbelt 2 can be improved. In addition, in the case in which there is a low possibility that the user is inside or is in the vicinity of the vehicle 13, it is possible to prevent the dark current from increasing unnecessarily.

The seatbelt control device, the seatbelt apparatus, and the control method are described above by way of embodiments, however, the present invention is not limited to these embodiments. Various variations, modifications, and substitutions of a part of all of embodiments may be made within the scope of the present invention.

For example, the door 12 illustrated in FIG. 1 is not limited to the passenger door, and may be other doors provided on the vehicle 13. For example, the door may be a fuel lid that is opened and closed when supplying fuel, a tailgate or a trunk gate provided at a luggage space at a rear part of the vehicle 13, or the like.

In addition, the door signal may be replaced by an other signal, as long as the other signal can be turned on and off in the off state of the ignition, and it is possible to estimate from the other signal that the user is inside or is in the vicinity of the vehicle. Examples of the other signal include an actuating signal of power windows, an actuating signal of power seats, an actuating signal of the belt reel 8, or the like.

Moreover, the power supply circuit 31 illustrated in FIG. 2, for example, may suppress the supply of power with respect to the entire control circuit 40, or suppress the supply of power with respect to a part of the control circuit 40. For example, the power supply circuit 31 may suppress the supply of power with respect to the motor controller 41 and the sleep transition judging unit 43, and does not necessarily have to suppress the supply of power with respect to the motor driver 42. A target with respect to which the supply of power is to be suppressed may be appropriately modified.

Furthermore, FIG. 2 illustrates an example in which the buckle signal output from the buckle switch 24 is input directly to the control circuit 40. However, the buckle signal may be input to the control circuit 40 via the restricting circuit 30 to which the power from the power supply 21 is constantly supplied.

This application is based upon and claims the benefit of priority of Japanese Patent Application No. 2013-057314, filed on Mar. 19, 2013, the entire contents of which are incorporated herein by reference.

DESCRIPTION OF REFERENCE NUMERALS

1 Seat Belt Control Device
2 Seatbelt
3 Shoulder Anchor
4 Tongue
5 Buckle
6 Retractor
7 Motor
8 Belt Reel
9 User
10 Signal Line
11 Seat
12 Door
13 Vehicle
21 Power Supply
22 Ignition Switch (IG SW)
23 Door Switch (Door SW)
24 Buckle Switch (Buckle SW)
30 Control Circuit
31 Power Supply Circuit
32 Wakeup Judging Unit
40 Control Circuit
41 Motor Controller
42 Motor Driver
43 Sleep Transition Judging Unit
100 Seatbelt Apparatus

The invention claimed is:

1. A seatbelt control device that controls a seatbelt provided in a vehicle, comprising:
a restricting circuit that restricts control of the seatbelt in each of a first mode, a second mode, a third mode, and a fourth mode,
wherein the restricting circuit performs a process including
in the first mode in which an elapsed time from an ignition off state is less than a predetermined time and a door of the vehicle is open, restricting the control of the seatbelt when a first set time elapses in a state in which no change occurs in a buckle signal that distinguishes between a fastened state and an unfastened state of the seatbelt, and a second set time elapses in a state in which no change occurs in a door signal that distinguishes between an open state and a closed state of the door,
in the second mode in which the elapsed time from the ignition off state is less than the predetermined time and the door of the vehicle is closed, restricting control of the seatbelt when a third set time elapses in the state in which no change occurs in the buckle signal, and a fourth set time elapses in the state in which no change occurs in the door signal,
in the third mode in which the elapsed time from the ignition off state is the predetermined time or greater and the door of the vehicle is open, restricting the control of the seatbelt when a fifth set time elapses in the state in which no change occurs in the buckle signal, and a sixth set time elapses in the state in which no change occurs in the door signal, and in the fourth mode in which the elapsed time from the ignition off state is the predetermined time or greater and the door of the vehicle is closed, restricting the control of the seatbelt when a seventh set time elapses in the state in which no change occurs in the buckle signal, and an eighth set time elapses in the state in which no change occurs in the door signal, and wherein the second set time is longer than the fourth set time, and the sixth set time is longer than the eighth set time.

2. A seatbelt control device that controls a seatbelt provided in a vehicle, comprising:
a restricting circuit that restricts control of the seatbelt at a timing slower in a case in which a possibility of the seatbelt being fastened or unfastened is higher than that for a case in which the possibility of the seatbelt being fastened or unfastened is low.

3. The seatbelt control device as claimed in claim 2, wherein the possibility of the seatbelt being fastened or unfastened is judged to be high when a door provided on the vehicle remains open and no operation is performed on the door and a buckle, and the possibility of the seatbelt being fastened or unfastened is judged to be low when the door remains closed and no operation is performed on the door and the buckle.

4. The seatbelt control device as claimed in claim 2, wherein restricting the control of the seatbelt continues even when the seatbelt is fastened or unfastened in a state in which the control of the seatbelt is restricted.

5. The seatbelt control device as claimed in claim 2, further comprising:
a control circuit that controls the seatbelt,
wherein the restricting circuit restricts the control of the seatbelt by the control circuit by suppressing power supplied to the control circuit.

6. A seatbelt apparatus comprising:
the seatbelt control device as claimed in claim 2;
the seatbelt;
a retractor that takes up the seatbelt;
a tongue mounted on the seatbelt; and
a buckle to which the tongue is attached and from which the tongue is detached.

7. A control method that controls a seatbelt provided in a vehicle, comprising:
restricting, by a restricting circuit, control of the seatbelt in each of a first mode, a second mode, a third mode, and a fourth mode; and
performing, by the restricting circuit, a process including
in the first mode in which an elapsed time from an ignition off state is less than a predetermined time and a door of the vehicle is open, restricting the control of the seatbelt when a first set time elapses in a state in which no change occurs in a buckle signal that distinguishes between a fastened state and an unfastened state of the seatbelt, and a second set time elapses in a state in which no change occurs in a door signal that distinguishes between an open state and a closed state of the door, in the second mode in which the elapsed time from the ignition off state is less than the predetermined time and the door of the vehicle is closed, restricting the control of the seatbelt when a third set time elapses in the state in which no change occurs in the buckle signal, and a fourth set time elapses in the state in which no change occurs in the door signal, in the third mode in which the elapsed time from the ignition off state is the predetermined time or greater and the door of the vehicle is open, restricting the control of the seatbelt when a fifth set time elapses in the state in which no change occurs in the buckle signal, and a sixth set time elapses in the state in which no change occurs in the door signal, and in the fourth mode in which the elapsed time from the ignition off state is the predetermined time or greater and the door of the vehicle is closed, restricting the control of the seatbelt when a seventh set time elapses in the state in which no change occurs in the buckle signal, and an eighth set time elapses in the state in which no change occurs in the door signal, and wherein the second set time is longer than the fourth set time, and the sixth set time is longer than the eighth set time.

8. A seatbelt control device that controls a seatbelt provided in a vehicle, comprising:
a restricting circuit that restricts control of the seatbelt in a case in which restricting the control of the seatbelt is permitted,
wherein the restricting circuit, in a case in which a door provided on the vehicle is open, restricts the control of the seatbelt at a timing slower than that for a case in which the door is closed, and
wherein restricting the control of the seatbelt continues even when the seatbelt is fastened or unfastened in a state in which the control of the seatbelt is restricted.

9. A seatbelt control device that controls a seatbelt provided in a vehicle, comprising:
a restricting circuit that restricts control of the seatbelt in a case in which restricting the control of the seatbelt is permitted; and
a control circuit that controls the seatbelt,
wherein the restricting circuit, in a case in which a door provided on the vehicle is open, restricts the control of the seatbelt at a timing slower than that for a case in which the door is closed, and
wherein the restricting circuit restricts the control of the seatbelt by the control circuit by suppressing power supplied to the control circuit.

10. A seatbelt apparatus comprising:
the seatbelt control device as claimed in claim 1;
the seatbelt;
a retractor that takes up the seatbelt;
a tongue mounted on the seatbelt; and
a buckle to which the tongue is attached and from which the tongue is detached.

* * * * *